(12) United States Patent
Shallal et al.

(10) Patent No.: US 11,030,118 B2
(45) Date of Patent: Jun. 8, 2021

(54) DATA-LOCKING MEMORY MODULE

(71) Applicant: Rambus Inc., Sunnyvale, CA (US)

(72) Inventors: Aws Shallal, Cary, NC (US); Larry Grant Giddens, Raleigh, NC (US); Sarvagya Kochak, San Ramon, CA (US)

(73) Assignee: Rambus Inc., San Jose, CA (US)

( * ) Notice: Subject to any disclaimer, the term of this patent is extended or adjusted under 35 U.S.C. 154(b) by 1 day.

(21) Appl. No.: 15/849,507

(22) Filed: Dec. 20, 2017

(65) Prior Publication Data

US 2018/0260339 A1   Sep. 13, 2018

Related U.S. Application Data

(60) Provisional application No. 62/467,824, filed on Mar. 7, 2017.

(51) Int. Cl.
| | |
|---|---|
| *G06F 12/0862* | (2016.01) |
| *G06N 20/00* | (2019.01) |
| *G06F 12/14* | (2006.01) |
| *G06F 3/06* | (2006.01) |
| *G06F 21/79* | (2013.01) |
| *G06F 21/57* | (2013.01) |
| *G06F 9/4401* | (2018.01) |

(52) U.S. Cl.
CPC .......... *G06F 12/1408* (2013.01); *G06F 3/062* (2013.01); *G06F 3/0623* (2013.01); *G06F 3/0629* (2013.01); *G06F 3/0658* (2013.01); *G06F 3/0679* (2013.01); *G06F 3/0685* (2013.01); *G06F 9/4401* (2013.01); *G06F 21/575* (2013.01); *G06F 21/79* (2013.01); *G06F 2212/1052* (2013.01)

(58) Field of Classification Search
None
See application file for complete search history.

(56) References Cited

U.S. PATENT DOCUMENTS

| | | |
|---|---|---|
| 9,535,828 B1 | 1/2017 | McKelvie et al. |
| 2014/0040639 A1* | 2/2014 | Raam .................... G06F 21/606 713/193 |
| 2015/0089245 A1* | 3/2015 | Altman ................. G06F 21/602 713/193 |
| 2015/0244716 A1 | 8/2015 | Potlapally et al. |
| 2016/0203479 A1* | 7/2016 | Durant ............... G06Q 20/3829 705/71 |
| 2018/0253243 A1* | 9/2018 | Shenoy ............... G06F 12/1408 |

* cited by examiner

*Primary Examiner* — Jared I Rutz
*Assistant Examiner* — Marwan Ayash
(74) *Attorney, Agent, or Firm* — Charles Shemwell

(57) ABSTRACT

In a memory module, encryption information is received from an external source and stored exclusively within a non-persistent storage element such that the encryption information is expunged from the memory module upon power loss. Write data is received and encrypted using the encryption information stored within the non-persistent storage element to produce encrypted data which is stored, in turn, within a nonvolatile storage of the memory module.

20 Claims, 3 Drawing Sheets

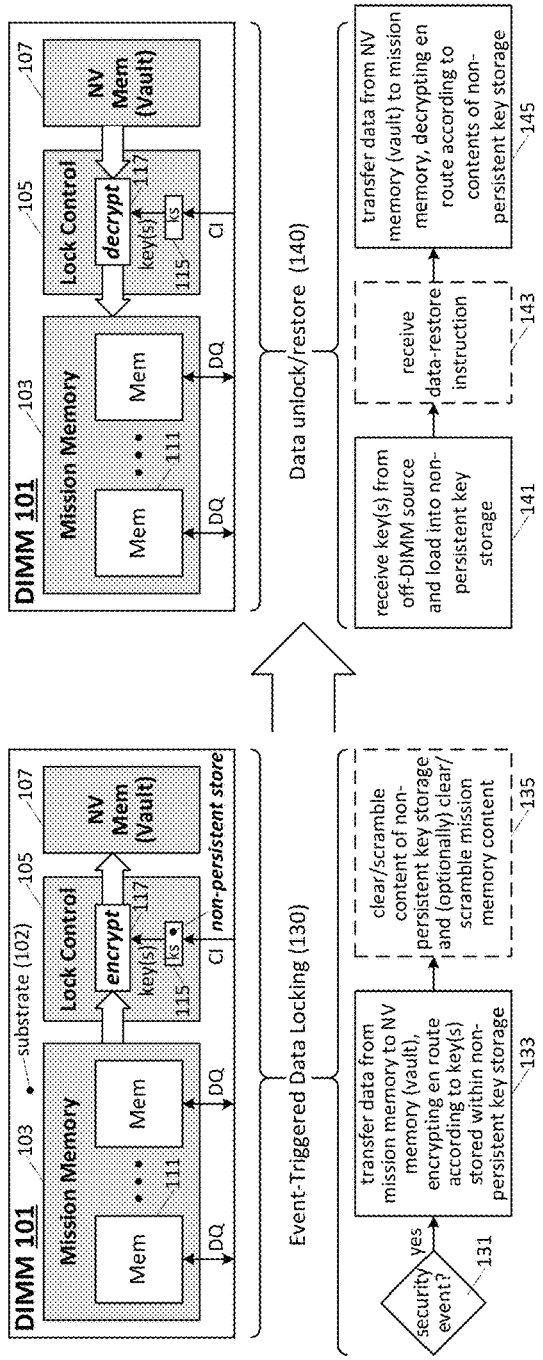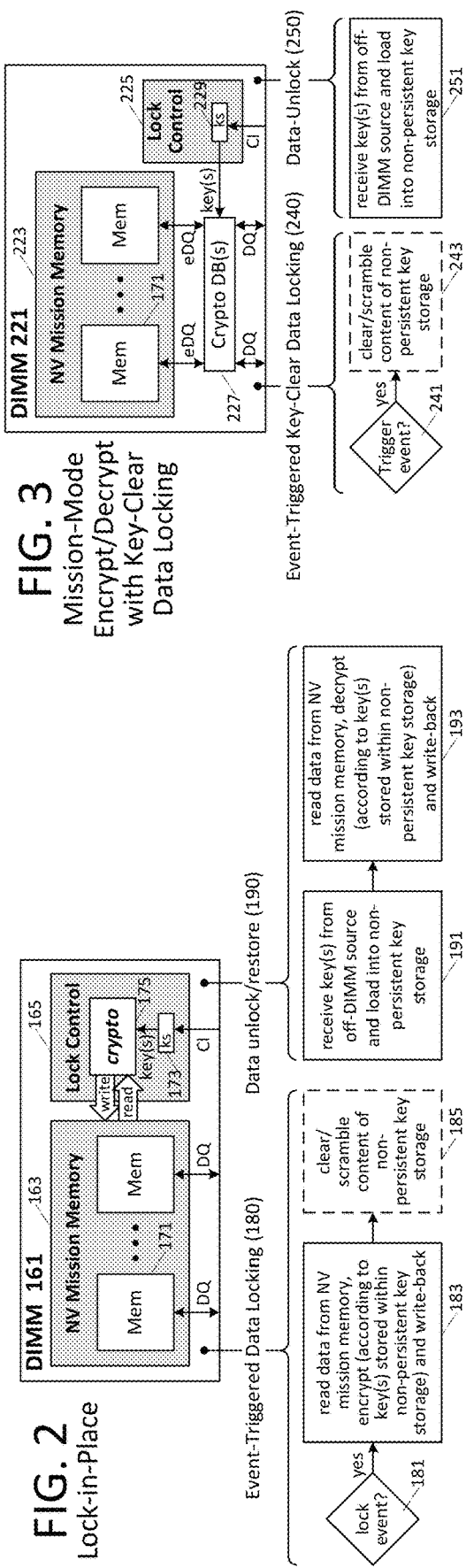

DATA-LOCKING MEMORY MODULE

CROSS REFERENCE TO RELATED APPLICATIONS

This application hereby claims priority to and incorporates by reference U.S. provisional application No. 62/467,824 filed Mar. 7, 2017.

TECHNICAL FIELD

The present disclosure relates generally to data processing and more particularly to secure data storage.

DRAWINGS

The various embodiments disclosed herein are illustrated by way of example, and not by way of limitation, in the figures of the accompanying drawings and in which like reference numerals refer to similar elements and in which:

FIG. 1 illustrates a data-locking memory module according to a lock-in-vault embodiment;

FIG. 2 illustrates data locking and unlocking operations within an exemplary lock-in-place memory module;

FIG. 3 illustrates an embodiment of a data-locking memory module that performs data encryption/decryption during mission-mode memory access;

DETAILED DESCRIPTION

Figure 4:
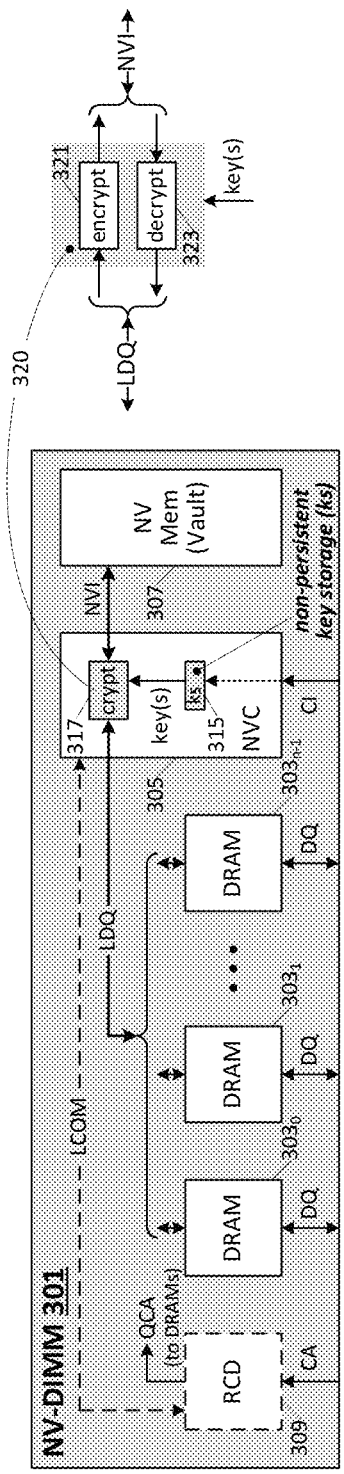
FIG. 4 illustrates a more detailed embodiment of a lock-in-vault memory module.

Memory modules that encrypt and store mission-mode data in persistent storage without persistent in-situ retention (i.e., on-module retention) of information necessary to decrypt that data are disclosed herein in various embodiments. In a number of "lock in vault" embodiments, for example, unencrypted mission-mode data is maintained in a non-persistent primary storage (e.g., dynamic random access memory (DRAM), static random access memory (SRAM), etc.) and then, when triggered by security event detection, the data is encrypted en-route to persistent storage within a nonvolatile memory "vault." One or more keys (which in all embodiments herein may be fragments of key(s) or seed information used to derive key(s)) applied to encrypt the mission-mode data are expunged (discarded, cleared, scrambled, deleted, dissipated or otherwise rendered unavailable in whole or part) in response to or as a consequence of the security event detection, preventing access to the encrypted data within the nonvolatile vault without external provision of the one or more keys.

In other "lock in place" embodiments, the primary storage of the memory module is itself a persistent storage and employed as both the mission memory (i.e., the memory subject to host-directed read/write access during normal operation of the memory module) and the encrypted data destination during data lock-down. More specifically, mission-mode data is generally stored within the persistent mission memory in "unencrypted" form (i.e., as-received-from the host, though the host may itself apply a layer/level of encryption) until detection of a security event (e.g., power-loss event, affirmative security signal/command from host or any other information indicative of a potential compromise of mission-mode data). Upon security-event detection, the memory module executes a read-encrypt-write transaction, reading unencrypted mission-mode data from the mission memory, encrypting the mission-mode data and then writing the mission-mode data back to mission memory, overwriting all or at least critical portions of the unencrypted data with its encrypted counterpart. As with lock-in-vault embodiments, key(s) applied to encrypt the mission-mode data are discarded in response to detection of the security event, rendering the encrypted data within the mission memory undecipherable without provision of the one or more keys from an external source.

In yet other "mission-mode encrypting" embodiments, data is encrypted and decrypted within the memory module input-output (I/O) interface as part of mission mode write and read access, respectively. Thus, data is stored within the mission memory in encrypted form at all times so that no event-triggered encryption action is required. By this arrangement, data lock-down may be effected by merely discarding at least the key(s) used to decrypt data within the memory module read-out interface (i.e., outbound data path within the memory module data I/O or signaling interface), effectively rendering the encrypted data within the mission memory undeciperable without provision of the decryption key(s) from an external source In all embodiments, various aspects of security actions (e.g., granularity of locked data entity, whether to execute mission-mode encryption/decryption, strength of encryption, encryption algorithm, specification of security events that will trigger data locking, etc.) may be programmed within a policy configuration component of the data-locking memory module itself, thus permitting security policies and corresponding data-locking/unlocking actions to be tailored according to application needs (e.g., trading encryption strength for access latency).

FIG. 1 illustrates an embodiment of a data-locking memory module 101 having a mission memory 103, lock controller 105 and nonvolatile memory vault 107 that collectively implement a lock-in-vault security function as generally discussed above. In the depicted example, mission memory 103 includes multiple discrete memory components 111 each disposed inline on a face of module substrate 102 and coupled to a respective data signaling path (DQ) that extends from the memory component to a connector-edge of substrate 102 (e.g., each such path to be coupled to a respective external data signaling path that extends to a host memory control unit disposed externally with respect to data-locking memory module 101)—an arrangement referred to herein as an inline memory module and, in this case, a dual inline memory module or DIMM as mission memory components 111 may be aligned on front and back faces of the module substrate). Each individual memory component 111 may be constituted by a single memory die or multiple memory dies (e.g., in a multi-die package such as a stacked and/or side-by-side die package) and generally includes a core storage array, command/address/control signaling interface and data signaling interface, the details of which are unshown. The core storage array within each memory component 111 may be implemented by any practicable solid-state memory cell array (e.g., DRAM, SRAM, Flash memory, Phase-change memory, Resistive memory, etc.), with non-persistent mission memory components generally referred to herein as DRAMs and persistent (nonvolatile) memory components referred to herein as Flash memories. In the particular embodiment of FIG. 1, for example, mission-memory 103 may be populated by rows of discrete DRAM components (single-die or multi-die components) that lack battery backup such that, upon loss of power to the memory module, mission-memory content is promptly expunged.

Still referring to FIG. 1, lock controller 105 includes a non-persistent key storage element 115 (e.g., an SRAM register) in which one or more data-encryption keys are stored, and also a cryptographic circuit 117 that performs data encryption and decryption operations with respect to data transferred between mission memory 103 and nonvolatile memory vault 107. Accordingly, as shown in exemplary data-locking sequence 130, upon detection of security event at 131, lock controller 105 (and possibly other collaborating components within memory module 101) transfers data from mission memory to the nonvolatile memory vault as shown at 133, encrypting the data en route (i.e., within cryptographic circuit 117) according to key(s) stored within non-persistent key storage 115. In the case of a power-loss security event (i.e., on-module detection of imminent power loss and/or reception of information indicating imminent power loss), the content of the mission memory and non-persistent key storage may be presumed to shortly dissipate (i.e., be lost as a consequence of the power loss) so that storage of encrypted data within the nonvolatile memory is sufficient to complete the data-locking action. By contrast, upon detecting a persistent-power security event (i.e., any event indicative of potential data compromise other than a power-loss event), the lock controller may clear (delete, scramble, or otherwise obfuscate or render unusable for decryption purposes) the content of the non-persistent key storage and may also clear the mission-memory content—operations shown at 135. In one embodiment, for example, lock controller 105 may disable power delivery to mission-memory 103, effectively forcing loss of the memory content. In other embodiments, particularly where the mission memory is itself a persistent memory, the lock controller may execute (or at least initiate execution of) a data overwrite, erase operation, etc. to clear or obfuscate all or any portion of the mission memory content.

After completing the data-locking action shown at 130, encrypted mission-mode data is stored within nonvolatile memory vault 107 without retention of key(s) (including key fragments or information that enables derivation of keys or fragments thereof) necessary to decrypt the mission-mode data. Thus, without procurement of key(s) from a source external to the memory module, the mission-mode data is effectively locked in a secure form. Moreover, as discussed below, the key(s) needed for mission-mode data decryption are generally stored in one or more locations external to the host computing platform (e.g., server or other discrete computing device in which memory module 101 resides) so that, even with physical theft of the memory module or host computing platform, the unencrypted mission-mode data will be inaccessible. Similarly, in the event of an electronic intrusion that triggers the data locking action shown at 130, unencrypted mission-mode data will be inaccessible to the intruder having access only to in-situ information (i.e., information stored within the memory module and/or host platform). Further, by providing for external provision of the key(s) needed for mission-mode data decryption, an enterprise or network system architect may implement a broad/flexible variety of security strategies to prevent coordinated access to the external key storage source and locked memory content within memory module 101.

Still referring to FIG. 1, an exemplary data unlock/restore operation is shown at 140 and commences at 141 with the lock controller receiving keys from an ex-situ source (i.e., source external to memory module and, in a number of embodiments, external also to the host platform) and loads the key(s) into non-persistent key storage 115 within memory module 101. Thereafter, upon receiving an explicit data-restore instruction at 143 (an optional action as reception of an instruction/command to receive and store the keys may constitute an explicit or implicit data-restore instruction), lock controller 105 transfers data from the nonvolatile memory vault to mission memory, decrypting en route within cryptographic circuit 117 according to the key(s) loaded into non-persistent key storage 115.

FIG. 2 illustrates data locking and unlocking operations within an exemplary lock-in-place memory module 161. While depicted as a DIMM, memory module 161 may be implemented in various other form factors in alternative embodiments (e.g., system in package, package on package, three-dimensional IC, etc.)—alternatives that apply with respect to all DIMM-form-factor memory modules disclosed herein.

In contrast to the lock-in-vault implementation shown in FIG. 1, memory module 161 lacks a distinct nonvolatile memory vault and instead performs in-situ data locking within a nonvolatile mission memory 163 itself—implementing a circular read, encrypt and write-back data-locking flow via lock controller 165. More specifically, as shown in exemplary data-locking sequence 180, upon detecting a security (lock-triggering) event at 181, lock controller 165 reads data from the nonvolatile mission memory (i.e., constituted by components 171), passing the read-out data through cryptographic circuit 175 to be encrypted in accordance with one or more keys stored in non-persistent key storage 173 and then writing the encrypted data back into the nonvolatile mission memory (i.e., data circulation as shown at 183 in the data locking sequence). In one embodiment, encrypted data is buffered temporarily within lock controller 165 (buffer not shown) before being written back to mission memory 163, thus enabling unencrypted data read-out from a given storage region within mission memory before that region is overwritten with encrypted data. In an alternative embodiment, storage circuitry within the cryptographic unit 175 (i.e., in which the encrypted data is generated/synthesized) is sufficient to buffer data destined for encrypted write-back so that a dedicated read-out and/or write-back buffer need not be provided. In any case, after the mission-mode data has been read-out, encrypted and written back into mission memory 163, lock controller 165 may optionally clear/scramble the content of the non-persistent key storage as shown at 185 (i.e., if the key-storage content will not naturally dissipate due to power loss) to complete the data-locking operation. Data unlocking is executed generally as described with respect to FIG. 1 except that nonvolatile mission memory 163 sources the encrypted data rather than a dedicated nonvolatile memory vault. Thus, key(s) are received from an off-DIMM source and loaded into the non-persistent key storage at 191 followed by a circular read-decrypt-write-back sequence (193) that reverses the encryption operation shown at 183. Though not specifically shown, an explicit data-restore instruction received from the host may trigger the read-decrypt-write-back sequence as generally discussed in reference to FIG. 1.

FIG. 3 illustrates an embodiment of a data-locking memory module 221 that performs data encryption/decryption during mission-mode memory access. As shown, memory module 221 is implemented as a DIMM (various other module form factors may be implemented as discussed above) and includes a nonvolatile mission memory 223 and lock controller 225 together with data encryption and decryption circuitry interposed within the mission-mode write and read paths (depicted as a cryptographic data buffer circuit 227)—an arrangement that yields encrypted mission memory content at all times (i.e., at least during normal mission-mode memory access). Accordingly, as shown in exemplary locking sequence 240, data locking in response to trigger event 241 may be effected by affirmatively clearing/scrambling the content of the non-persistent key storage as shown at 243 (i.e., clearing storage 229 within lock controller 225) or by removing power to such key storage as will happen naturally in a power-down event. Data-unlocking (250) is similarly streamlined, with keys being received from an off-module source and loaded into non-persistent key storage 229 (i.e., as shown at 251) to render decrypted-read access to mission memory content.

FIG. 4 illustrates a more detailed embodiment of a lock-in-vault DIMM 301 (which may be implemented in various other memory-module form factors) that includes a multi-DRAM mission memory (i.e., plurality of DRAM components $303_0$-$303_{n-1}$, collectively referenced as mission memory 303), nonvolatile-memory controller 305 (NVC or "nonvolatile controller"), nonvolatile memory vault 307 and an optional register clock driver (RCD) to distribute command/address (CA) and timing signals to constituent DRAM components of mission memory 303. In the specific embodiment shown, DRAM components of mission memory 303 (each a single die or multi-die package) are dual-ported, each having a primary data interface coupled to host DQ path (i.e., a set of one or more data signaling links that extends from the DRAM component to a connector edge of the DIMM) and a secondary "LDQ" data interface to enable data transfer to and from nonvolatile memory vault 307 via nonvolatile controller 305 during data locking and unlocking operations (i.e., passing through cryptographic circuitry 317 to be encrypted per content of key storage 315 on the way to vault 307 and decrypted upon return transit from vault 307 to mission memory 303). In alternative embodiments, constituent DRAMs of mission memory 303 may lack the secondary data interface (i.e., each DRAM having a single data port), and multiplexing structures (e.g., within data buffers or other I/O path components not specifically shown) may be provided instead to steer outbound data (e.g., data read out of the DRAM components) to either the module data interface (i.e., edge of module connector interface) or the nonvolatile controller/nonvolatile memory vault according to commanded operation, and conversely to select either the nonvolatile controller/vault or the module data interface as the source of inbound data (e.g., write data). In the latter implementation (single-ported DRAM components), the multiplexed connections to the singular data interfaces of the mission-memory DRAM components $303_0$-$303_{n-1}$ may be coupled to the LDQ interface of nonvolatile controller 305 to achieve the same effective functionality as in the depicted (dual-ported) DRAM implementation.

Still referring to FIG. 4, register clock driver 309, if present, forwards command/address signals, control signals (e.g., chip-select, clock-enable, etc.) and timing signals to the DRAM components (or subset-collections thereof) via one or more signaling paths shown collectively as "QCA" in response to reception of like signals via the DIMM connector interface (e.g., shown generally as "CA"). Register clock driver 309 may also communicate with nonvolatile controller 305 via communication path "LCOM" to convey keys (or fragments thereof), commands, trigger-event information, etc. Nonvolatile controller 305 may alternatively or additionally receive host commands and information (e.g., keys or fragments thereof, security event information, etc.) via communication interface CI (e.g., an I2C interface (Inter-Integrated Circuit Protocol), I3C interface, SPI (Serial Peripheral Interface), or any other practicable signaling interface). Referring to detail view 320, cryptographic circuit 317 is disposed between the LDQ interface and nonvolatile memory interface (NVI) of nonvolatile controller 305 and interposes encryption circuit 321 and decryption circuit 323 within the data paths to and from the nonvolatile memory vault, respectively. As shown, one or more keys from non-persistent key storage 315 (e.g., loaded into key storage 315 in response to communications conveyed via paths CI and/or LCOM) are supplied to cryptographic unit 317 to enable data encryption/decryption operations with respect to data proceeding to/from nonvolatile memory vault 307.

Figure 5:
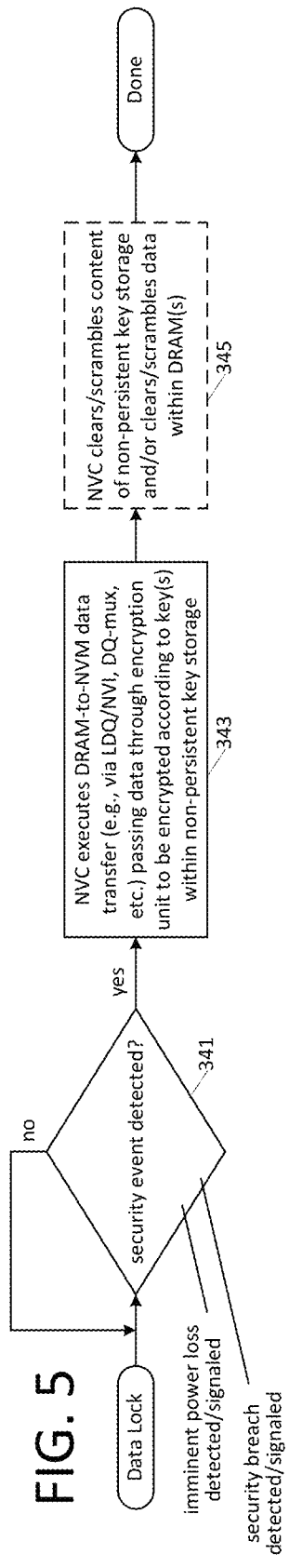
FIG. 5 illustrates an exemplary data-locking operation within the memory module of FIG. 4.

FIG. 5 illustrates an exemplary data-locking operation within the memory module of FIG. 4. Upon detecting a security event at 341 (e.g., any event or signal indicative of potential loss of security with respect to data stored in mission memory, including a loss of power that would enable undetectable physical removal of memory module and/or the host platform in which it resides), the nonvolatile controller (NVC) executes a DRAM-to-nonvolatile-memory data transfer as shown at 343, passing data through encryption unit 321 of FIG. 4 to be encrypted according to key(s) within non-persistent key storage 315. If contents of the key storage and/or mission memory are not certain to dissipate through power loss (and even if such data loss is certain), the nonvolatile controller may conclude the data locking operation as shown at 345 by affirmatively clearing (or scrambling or otherwise obfuscating) the content of the non-persistent key storage and/or data within the mission-memory DRAM components.

Figure 6:
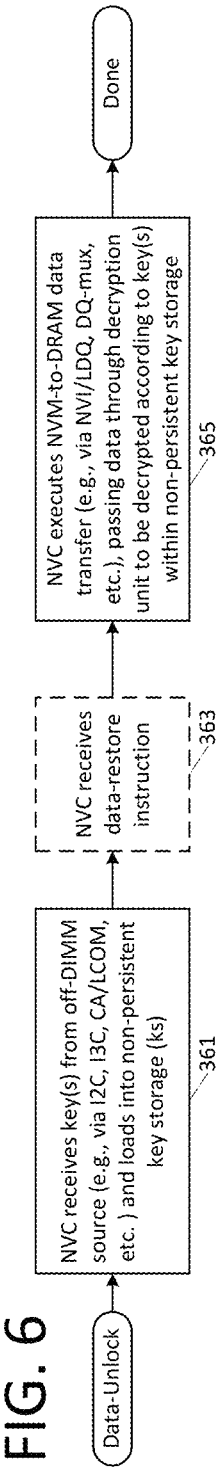
FIG. 6 illustrates an exemplary data-unlocking operation within the memory module of FIG. 4.

In the exemplary data unlocking operation shown at FIG. 6, the nonvolatile controller receives one or more data decryption key(s) from an off-module source (e.g., via interface CI and/or CA/LCOM) at 361, and loads the key(s) into non-persistent key storage (e.g., element 315 of FIG. 4). In one embodiment, the nonvolatile controller receives an explicit data-restore instruction from the host platform (e.g., received via communication interface CI and/or CA/LCOM) at 363—a command reception that may be omitted in an alternative embodiment that interprets the key load operation at 361 as in implicit instruction to perform a data restore. In either case, the nonvolatile controller executes a nonvolatile-memory-to-DRAM data transfer at 365 (e.g., via multiplexed access to a sole DRAM data port, or dedicated/multiplexed access to a secondary DRAM data port as generally discussed above), passing the vault-sourced encrypted data through decryption unit 323 of FIG. 4 to be decrypted in accordance with the key(s) loaded into non-persistent key storage 315, and then writing the decrypted data into the mission-memory DRAM components.

Figure 7:
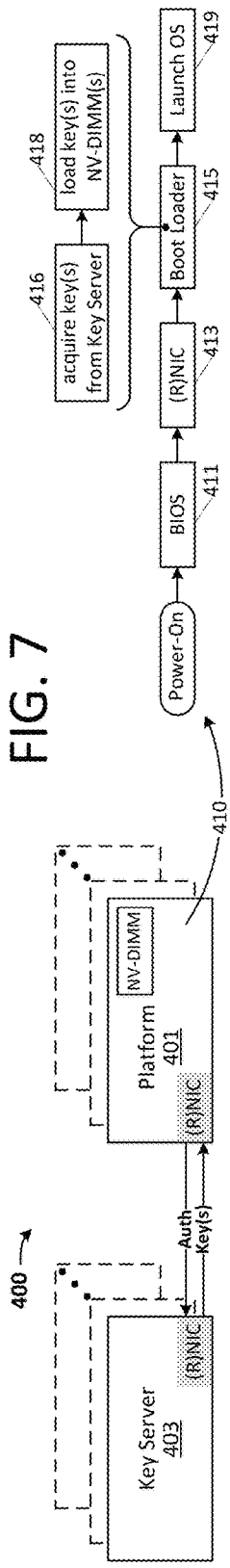
FIG. 7 illustrates an exemplary network of computing systems that includes at least one computing platform that hosts data-locking memory module(s) and at least one "key server" computing device that serves as a run-time source of key(s) for unlocking data within the data-locking memory module(s)

FIG. 7 illustrates an exemplary network of computing systems 400 that includes (i) at least one computing platform 401 having one or more data-locking memory modules "NV-DIMM", and (ii) at least one "key server" computing device 403 that serves as a run-time source of key(s) for unlocking data within data-locking memory modules. More generally, computing network 400 may include numerous computing platforms 401 all of which acquire data-unlocking key(s) from a single key server 403 (many-to-one), numerous key servers 403 to deliver respective keys to a single computing platform 401 (e.g., with each key enabling a respective quantum of data to be unlocked in accordance with key-to-data granularity as discussed below), or plural key servers 403 to deliver keys to plural computing platforms 401 with the key-server/computing-platform ratio being less than one, greater than one or equal to one.

FIG. 7 also illustrates an exemplary power-up sequence 410 executed within a representative computing platform 401. Starting at 411, the computing platform executes boot-up program code that enables (or constitutes) basic input-output services (BIOS), and follows at 413 by establishing network communications via a network interface controller (NIC), which may optionally be an RDMA-enabled NIC or RNIC. At 415, a boot-loader program—program code that may, for example, form an extension of the BIOS program code—is executed to acquire from the key server(s) 403 one or more keys needed to unlock data within platform-hosted (platform resident) data-locking memory modules. In one embodiment, key exchange is executed in separate authentication and delivery phases, with the platform requesting key(s) from the key server and providing authentication information either as part of the key request or in response to a subsequent challenge from the key server. The key server certifies the platform/key request (e.g., confirming authentication information against previously recorded certifying/authenticating information) and issues keys to the platform thereafter. More generally, any practicable key exchange protocol (including encrypted communication) may be implemented between the platform and key server to authenticate a key request and deliver key(s) to the platform.

Still referring to FIG. 7, after acquiring key(s) from the key server (416), the platform loads the key(s) into respective non-persistent key storage elements within the resident data-locking memory modules 418 and then launches the platform operating system (419). Though not specifically shown, when hosting lock-in-vault or lock-in-place memory modules, platform 401 may additionally command the memory modules to execute data-unlocking operations to render any restored mission memory content to unencrypted form (e.g., as shown at 143 and 149 of FIGS. 1 and 2, respectively).

Figure 8:
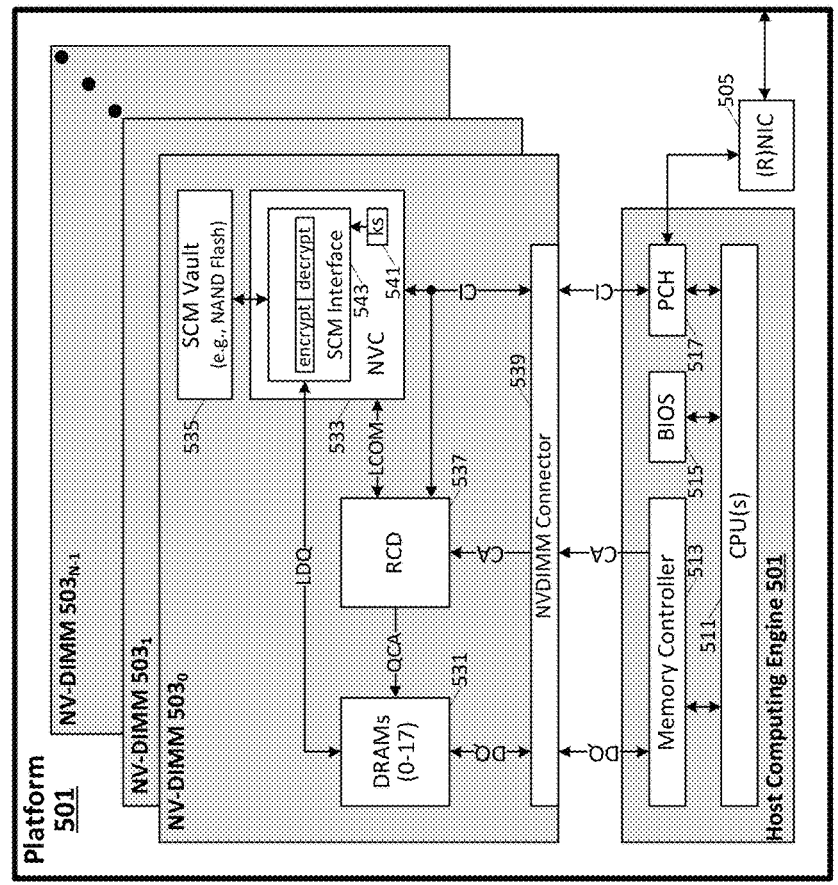
FIG. 8 illustrates a more detailed view of a computing platform that may be used to implement any of the one or more computing platforms shown in FIG. 7.

FIG. 8 illustrates a more detailed view of a computing platform 500 that may be used to implement any of the one or more computing platforms shown in FIG. 7. In the depicted embodiment, platform 500 includes a host computing engine 501 (the "compute engine" or "host"), network interface controller 505 (with or without RDMA-enable) and one or more data-locking memory modules $503_0$-$503_{N-1}$ (collectively referenced as "503"), with each of those modules depicted as a non-volatile DIMM ("NV DIMM"). The host computing engine itself includes a memory controller 513, BIOS storage 515 and platform controller hub 517 (PCH) all interconnected to one or more central processing units 511 (i.e., "CPU(s)"—each or any of which may include multiple processor cores). The platform controller hub 517 (or like peripheral component interconnect) is coupled to network interface controller 505 which includes (or coupled in turn to) one or more external network interfaces (e.g., interfaces that enable wired and/or wireless network connectivity according to standards-based or proprietary communications protocols). The component elements of host computing engine 501 may be integrated within a system on chip (SOC) or multi-die integrated circuit package (e.g., system in package, package in package, package on package, 3D IC, etc.) or within one or more discrete IC dies or IC packages, and the specific architecture shown (i.e., set of components and interconnection therebetween) may be reorganized in any practicable arrangement. For example, network interface controller 505 may be integrated within the host computing engine 501 in an alternative embodiment and coupled directly to CPU(s) 511 (i.e., without intervening PCH connection). Similarly, various additional physical and logical components may be present within host computing engine 501 and/or the platform in which the computing engine resides, including, for example and without limitation, a power supply input, power-loss detection circuitry, one or more timing signal generators and so forth.

Still referring to FIG. 8, each of the data locking memory modules 503 is implemented generally according to the lock-in-vault embodiment shown in FIG. 4. Lock-in-place and/or mission-mode encrypt/decrypt embodiments may be implemented instead or in addition to the lock-in-place embodiment shown, and the depicted lock-in-place embodiment may be varied in numerous regards as generally discussed above. For example, the mission memory type and component count (depicted as a set of 18 dual-ported DRAM components 531 per memory module surface and thus 36 DRAM components per memory module in the dual-inline and 36×DC DRAM dies per memory module, where 'DC' is the DRAM die count per DRAM component) may be implemented differently (e.g., nonvolatile memory or SRAM instead of DRAM, single-ported DRAM instead of dual-ported instances, etc.), register clock driver 537 may be omitted, the nonvolatile controller interface (CI) extending from nonvolatile controller 533 to edge connector 539 may be omitted in favor of control via the CA/LCOM signaling paths, and so forth. As in lock-in-vault embodiments described above, nonvolatile controller 533 (NVC) includes a non-persistent key storage 541 and an encrypting/decrypting interface 543 with respect to a nonvolatile memory vault 535, in this case shown as a storage class memory (SCM) implemented, for example, by NAND Flash memory. Any of various other nonvolatile memory types (NOR Flash, Magneto-Resistive memory, Phase change memory, battery-backed DRAM memory, etc.) may alternatively be used to implement nonvolatile memory vault 535 or any other nonvolatile memory described/depicted herein.

Figure 9:
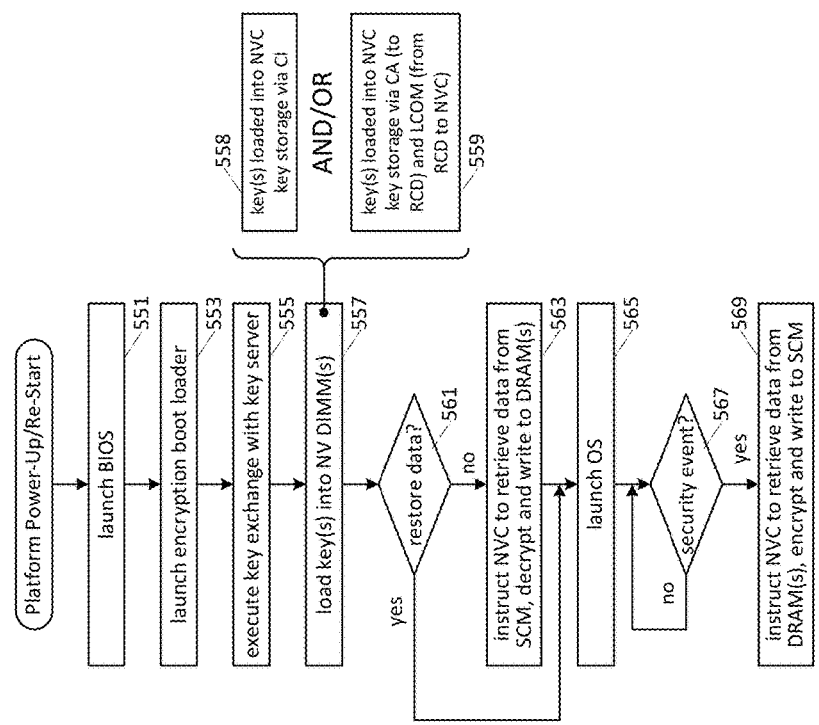
FIG. 9 illustrates an exemplary platform power-up or re-start sequence executed within the host computing engine of FIG. 8.

FIG. 9 illustrates an exemplary platform power-up or re-start sequence executed within the host computing engine of FIG. 8. After power-up, the computing engine launches the BIOS at 551 (i.e., instantiates basic I/O services through execution of program code stored within BIOS storage 515 of FIG. 8), and then at 553 launches the encryption boot loader (which may also involve execution of program code stored within 515 or other nonvolatile memory accessible to CPU(s) 511). At 555, the computing engine acquires one or more data encryption/decryption keys from the key server (e.g., via communication through PCH/(R)NIC), and then loads those key(s) into non-persistent key storage elements within respective data-locking memory modules at 557. As shown at 558 and 559, the key loading operation at 557 may be effected via communication over direct-to-NVC signaling interface CI and/or communication over command/address path (CA) and thus via RCD element 537 and the RCD-to-NVC signaling path (e.g., LCOM).

Still referring to FIG. 9, if a data restore operation is to be performed within any or all of the data-locking memory modules (e.g., an affirmative determination at 561 made in whole or part based on information indicating whether a data-locking operation was carried out prior to the current re-start/power-up), then the host computing engine instructs the nonvolatile controllers (NVC) within those memory modules to execute data-unlock operations—retrieve data from the SCM vault, decrypt and write to the mission memory as shown at 563. Thereafter, the host computing launches the OS at 565 and commences mission-mode program execution. If a security event is detected at 567 (i.e., event indicating potential data compromise, including power-loss detection), the computing engine may notify the data-locking memory modules accordingly to trigger data-locking operations therein. In the specific embodiment shown, for example, the computing engine may instruct the nonvolatile controller within each resident data-locking memory module to execute a data-locking operation (e.g., retrieve data from mission memory, encrypt and write to the SCM vault as shown at 569, followed by clearing the mission memory content and key-storage element content if that information will not be lost in imminent power down). In alternative embodiments, the data-locking memory modules or any one or more thereof may autonomously execute data-locking operations, for example, in response to on-module detection of imminent power loss (e.g., determining that power to the memory module has been disabled or disconnected so that discharging of internal power rails is imminent) or other module-detectable indication of actual or possible security breach.

In any of the various data-locking memory modules disclosed herein, any practicable encryption algorithm (e.g., Blowfish, AES, RSA-Security (e.g., RC6), etc.) may be used for data encryption/decryption, including a diversity of such algorithms within a given computing network, computing platform and/or memory module. Further, the association of encryption keys and encrypted data units may be practiced at a broad range of granularities (e.g., key per platform, key per memory channel, key per memory module, key per mission memory component (per memory module), key per block I/O device implemented within memory module or collection thereof, key per mission memory die, key per mission memory erase unit, key per mission memory data page, and so forth. Encryption algorithm and granularity may be programmatically specified at a platform level and/or within data-locking memory modules themselves.

The various circuits and functional elements disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific module form factors, memory types, component quantities, interface types or protocols, interconnect architectures, and the like can be different from those described above in alternative embodiments. The term "coupled" is used herein to express a direct connection as well as a connection through one or more intervening circuits or structures. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A method of operation within a memory module, the method comprising:
   receiving encryption information from a source external to the memory module;
   storing the encryption information exclusively within a non-persistent storage element of the memory module such that the encryption information is expunged from the memory module upon power loss;
   receiving write data via a plurality of data paths and storing the write data within dynamic random access memory (DRAM) components that are (i) coupled respectively to the plurality of data paths such that a respective portion of the write data is stored within each of the DRAM components, and (ii) distinct from the non-persistent storage element; and
   after storing the write data within the DRAM components, receiving information indicative of potential security breach with respect to the write data other than a power-loss event, and, in response to receiving the information indicative of potential security breach:
     encrypting the write data using the encryption information stored within the non-persistent storage element to produce encrypted data;
     storing the encrypted data within the memory module in a nonvolatile storage that is distinct from the DRAM components and the non-persistent storage element; and after storing the encrypted data in the nonvolatile storage, expunging the encryption information from the non-persistent storage element and expunging the write data from the DRAM components.

2. The method of claim 1 wherein expunging the encryption information from the non-persistent storage element comprises overwriting the encryption information within the non-persistent storage element.

3. The method of claim 1 wherein storing the write data within the memory module comprises receiving a command/address value within a register clock driver component of the memory module and outputting corresponding command/address values from the register clock driver to command/address inputs of the DRAM components to instruct the DRAM components to store the write data.

4. The method of claim 1 wherein receiving the command/address value within the register clock driver component of the memory module comprises receiving the command/address value via a unidirectional command/address signaling path coupled to the register clock driver.

5. The method of claim 1 wherein
encrypting the write data using the encryption information comprises transferring the write data from the DRAM components to a nonvolatile storage controller having encryption circuitry therein; and
each of the DRAM components is a dual-ported component having a primary data interface coupled to a respective one of the data paths and a secondary data interface coupled to the nonvolatile storage controller.

6. The method of claim 1 wherein expunging the write data from the DRAM components comprises disabling operation of the DRAM components in a manner that forces loss of contents stored therein despite persistence of power to the memory module.

7. The method of claim 1 wherein storing the encryption information exclusively within the non-persistent storage element comprises storing the encryption information within a static random access memory (SRAM).

8. The method of claim 1 wherein:
encrypting the write data using the encryption information comprises transferring the write data from the DRAM components to a nonvolatile storage controller having encryption circuitry therein; and
each of the DRAM components is a single-ported component having a data interface switchably coupled to (i) a respective one of the data paths during write data reception and (ii) the nonvolatile storage controller for encryption of the write data.

9. The method of claim 1 further comprising
receiving a memory read command and address corresponding to the encrypted data; and
in response to the memory read command:
retrieving the encrypted data from the nonvolatile storage using the address;
decrypting the encrypted data to produce unencrypted read data; and
outputting the unencrypted read data from the memory module.

10. The method of claim 1 wherein receiving the encryption information comprises receiving information that constitutes or enables derivation of one or more data encryption keys.

11. A memory module comprising:
a first interface to receive encryption information from a source external to the memory module;
a non-persistent storage element and circuitry to store the encryption information exclusively within the non-persistent storage element such that the encryption information is expunged from the memory module upon power loss;
a second interface;
dynamic random access memory (DRAM) components to receive the write data via respective data paths coupled to the second interface and to store respective portions of the write data such that the write data is collectively stored within the DRAM components;
encryption circuitry;
non-volatile storage; and
control circuitry to receive information indicative of potential security breach with respect to the write data, other than a power-loss event, after the write data has been stored within the DRAM components and, in response to receiving the information indicative of potential security breach:
enable the encryption circuitry to produce encrypted data by encrypting the write data using the encryption information stored within the non-persistent storage element;
store the encrypted data within the nonvolatile storage; and
after the encrypted data has been stored within the nonvolatile storage, expunge the encryption information from the non-persistent storage element and expunge the write data from the DRAM components.

12. The memory module of claim 11 wherein the control circuitry to expunge the encryption information from the non-persistent storage element comprises circuitry to overwrite the encryption information within the non-persistent storage element.

13. The memory module of claim 11 further comprising a register clock driver component to receive a command/address value and, in response, output control signals to the DRAM components to instruct the DRAM components to store the write data.

14. The memory module of claim 11 wherein the register clock driver component comprises an unidirectional signaling interface to receive the command/address value via a unidirectional command/address signaling path.

15. The memory module of claim 11 wherein each of the DRAM components is a dual-ported component having a primary data interface coupled to a respective one of the data paths and a secondary data interface coupled to the encryption circuitry.

16. The memory module of claim 11 wherein the control circuitry to expunge the write data from the DRAM components comprises circuitry to disable operation of the DRAM components in a manner that forces loss of contents stored therein-despite persistence of power to the memory module.

17. The memory module of claim 11 wherein the non-persistent storage element comprises static random access memory (SRAM).

18. The memory module of claim 11 wherein each of the DRAM components is a single-ported component having a data interface switchably coupled to (i) a respective one of the data paths during write data reception and (ii) the encryption circuitry to enable transfer of the write data thereto following reception of the information indicative of potential security breach.

19. The memory module of claim 11 wherein the encryption information comprises information that constitutes or enables derivation of one or more data encryption keys.

20. A memory module comprising:
a nonvolatile storage;

a non-persistent storage register;

means for receiving encryption information from a source external to the memory module;

means for storing the encryption information exclusively within the non-persistent storage register such that the encryption information is expunged from the memory module upon power loss;

means for receiving write data via a plurality of data paths and for storing the write data within dynamic random access memory (DRAM) components that are (i) coupled respectively to the plurality of data paths such that a respective portion of the write data is stored within each of the DRAM components, and (ii) distinct from the non-persistent storage register and the nonvolatile storage; and means for receiving information indicative of potential security breach, other than a power-loss event, with respect to the write data stored within the DRAM components and, in response to receiving the information indicative of potential security breach:

encrypting the write data using the encryption information stored within the non-persistent storage register to produce encrypted data, storing the encrypted data within the nonvolatile storage, and after storing the encrypted data in the nonvolatile storage, expunging the encryption information from the non-persistent storage register and expunging the write data from the DRAM components.

\* \* \* \* \*